US006902024B2

(12) United States Patent
Miiller et al.

(10) Patent No.: US 6,902,024 B2
(45) Date of Patent: Jun. 7, 2005

(54) LATERAL OPERATOR RESTRAINT SYSTEM AND POSITION SENSOR FOR MATERIAL HANDLER

(75) Inventors: Kevin J. Miiller, Bismarck, ND (US); Daniel J. Krieger, Bismarck, ND (US); William H. Curl, Bismarck, ND (US); Bernard Poncet, Nantes (FR); Frederic Lichtenberger, Savenay (FR)

(73) Assignee: Clark Equipment Company, Woodcliff Lake, NJ (US)

( * ) Notice: Subject to any disclaimer, the term of this patent is extended or adjusted under 35 U.S.C. 154(b) by 54 days.

(21) Appl. No.: 10/376,839

(22) Filed: Feb. 28, 2003

(65) Prior Publication Data

US 2004/0099461 A1 May 27, 2004

Related U.S. Application Data

(60) Provisional application No. 60/429,755, filed on Nov. 27, 2002.

(51) Int. Cl.[7] ............................................. B60R 21/02
(52) U.S. Cl. ....................................... 180/271; 280/748
(58) Field of Search ................................ 180/268, 271, 180/281, 89.12; 280/748, 749, 753, 751; 296/190.03, 190.11

(56) References Cited

U.S. PATENT DOCUMENTS

| | | | |
|---|---|---|---|
| 3,899,042 A | 8/1975 | Bonar ........................ 180/82 C |
| 4,355,819 A | 10/1982 | Frisbee ........................ 280/752 |
| 4,392,660 A | 7/1983 | Mason et al. ................ 280/751 |
| 4,397,371 A | 8/1983 | Lynnes et al. ............... 180/271 |
| 4,579,191 A | 4/1986 | Klee et al. ................... 180/268 |
| 5,050,700 A | * 9/1991 | Kim ............................ 180/268 |
| 5,129,478 A | 7/1992 | Suenaga et al. ............. 180/268 |
| 5,201,378 A | 4/1993 | Bamford ..................... 180/6.48 |
| 5,240,366 A | 8/1993 | Bamford ..................... 414/686 |
| 5,383,532 A | * 1/1995 | Shonai et al. ............... 180/269 |
| 5,454,596 A | 10/1995 | Dirck ......................... 280/748 |
| 5,470,190 A | 11/1995 | Bamford et al. ............ 414/686 |
| 5,481,078 A | 1/1996 | Asche ........................ 200/85 A |
| 5,542,493 A | 8/1996 | Jacobson et al. ........... 180/272 |
| 5,664,637 A | 9/1997 | Ohta et al. .................. 180/286 |
| 5,931,254 A | 8/1999 | Loraas et al. ............... 180/272 |
| 5,938,237 A | * 8/1999 | Abels ......................... 280/753 |
| 5,984,040 A | 11/1999 | Lee ............................. 180/271 |
| 6,182,781 B1 | * 2/2001 | Beom ......................... 180/271 |
| 6,299,207 B1 | 10/2001 | Bares ......................... 280/748 |
| 2001/0030074 A1 | 10/2001 | Sauermann | |

FOREIGN PATENT DOCUMENTS

| | | |
|---|---|---|
| DE | 101 14 180 A1 | 9/2002 |
| EP | 0 443 828 A1 | 2/1991 |
| EP | 1 0969 002 A1 | 7/2000 |
| GB | 2 149 313 A | 6/1985 |

* cited by examiner

*Primary Examiner*—David R. Dunn
(74) *Attorney, Agent, or Firm*—Westman, Champlin & Kelly, P.A.

(57) ABSTRACT

A self-propelled material handler has a pivotally mounted boom on a frame, and a cab that is positioned adjacent the side of the boom. The cab has an operator's entrance and exit opening on a side of the cab, that is positioned to permit an operator to enter and exit the cab and sit on a seat in the cab. A lateral restraint bar is mounted between the seat and the cab opening, and is movable to a working position where it obstructs the cab opening so that portions of the operator cannot be moved outwardly through the cab side opening from the interior, and which pivots to a raised position to permit an operator to pass through the cab opening. When the restraint bar moves away from its working position, a signal is provided to disable machine controls.

16 Claims, 9 Drawing Sheets

LATERAL OPERATOR RESTRAINT SYSTEM AND POSITION SENSOR FOR MATERIAL HANDLER

The present application is based on and claims the benefit of U.S. Provisional Patent Application Ser. No. 60/429,755, filed Nov. 27, 2002, the content of which is hereby incorporated by reference in its entirety.

BACKGROUND OF THE INVENTION

The present invention relates to a lateral restraint system in a cab on a material handler or TOOL CARRIER that moves along side an operator's seat, and is particularly useful to restrain an operator when there is no side door on the cab operator access opening. The lateral restraint system includes a restraint bar and an arm rest on the exterior side of the operator and is movable from a working, operator and leg restraining position to a raised position. The restraint bar pivots upwardly so in its raised position it is out of the way to permit egress and entrance to the cab and the system has a sensor to disable controls when not in a working position. It is preferable that the operator wears a seat belt during operation to avoid injury.

Telescoping boom tool carriers or material handlers that have telescoping booms mounted onto a mobile platform are well known. These machines generally will have a pivoting boom along one side of the machine frame, with an operator's cab that is positioned on the frame and is laterally positioned relative to the boom. The cab has a side opening for the operator to get in and out of the cab on the opposite side of the cab from the boom. While many of these cabs are provided with doors over these openings, there are times when it is desirable to not have a door.

SUMMARY OF THE INVENTION

The present invention relates to a movable bar acting as a lateral operator restraint and has an arm rest portion for operator comfort. The pivoting restraint bar is mounted on the side of an operator's cab of a machine such as a material handler, adjacent to the operator access door opening, and positioned to the exterior side of the operator's seat. The operator restraint bar is oriented for movement from a working position wherein it is located to block lateral movement of the operator and the operator's foot and leg in a direction toward the exterior of the cab, and which can be manually moved upwardly out of the way easily for operator access and egress from the cab. As shown, the restraint bar is pivoted by a mounting linkage or other support arrangement can be used.

The lateral operator restraint system is primarily useful when there is no door provided for the cab operator access opening, to avoid involuntary or voluntary outward movement of the operator or of the operator's foot and leg that is adjacent to the cab opening. Moving the foot and leg outside of the cab or canopy is restrained.

The manually operated restraint bar is provided with a spring to hold it in its working position, and also to hold it in its open position. The restraint bar is provided with a sensor or switch that senses when the restraint bar is not in its working position (and thus the operator is not present) to permit the machine controls to be disabled through an interlock control system. When the restraint bar moves a selected distance from its working position toward the raised or non-working position, the sensor provides a signal to the interlock circuit to disable the machine controls so the material handler machine cannot be moved or operated and preferably the brake is applied. Therefore, the machine can be operated only when the restraint bar is in its working position, meaning an operator is present.

Normally the material handlers use a joystick control, and all of the functions that are controlled by the joystick will be disabled by the interlock when the restraint bar is moved to its raised or open position. This means that the boom cannot be lifted, lowered, or telescoped, and the dump and crowd controls for attachments, and the auxiliary controls for the attachment cannot be utilized. The transmission and frame leveling functions also can be disabled so that the machine could not be moved, and at the same time brakes for the machine can be enabled holding the machine stationary when the operator restraint bar and arm rest portion is raised.

The restraint bar is very simply operated. A retainer for holding the lower portion of the restraint bar in place when in its working position is provided. It is used with an armrest pad of suitable design in the lowered or working position. Bumpers on the cab surfaces for stopping the restraint bar when it is moved to its raised position are also provided. The restraint bar is out of the way, and shielded by the cab panels when it is in its open position.

As shown, the sensor system for providing a signal to the interlock circuit for the material handlers controls, is a Hall effect sensor. The sensor is mounted stationarily on the door post or side panel of the machine cab and a magnet is mounted to move with the restraint bar mount, so that when the restraint bar has moved a selected distance away from its working position, the controls to the material handler will be completely disabled.

DETAILED DESCRIPTION OF THE PREFERRED EMBODIMENTS

Figure 1:
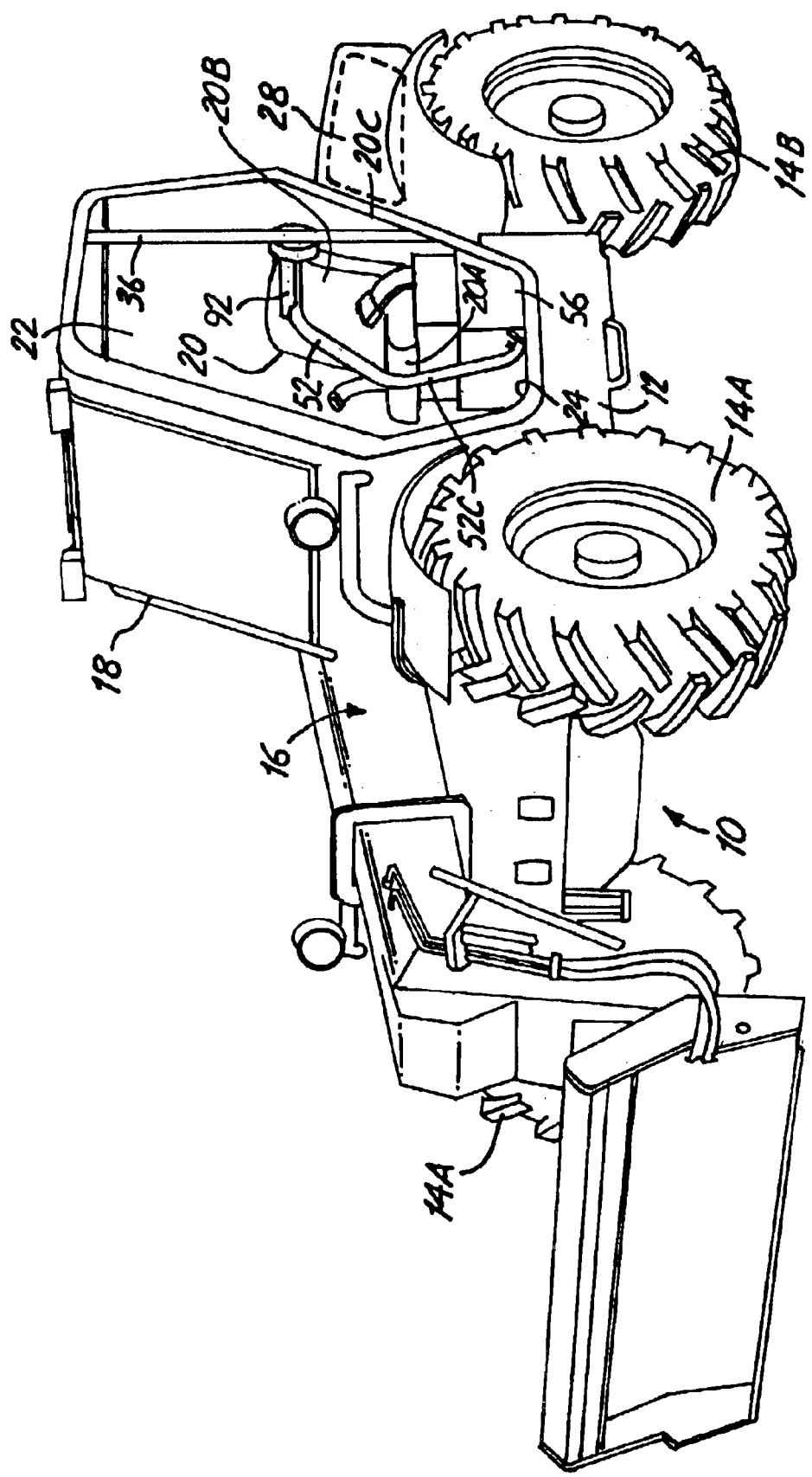
FIG. 1 is a perspective view of a material handler including a pivotal boom and having a restraint bar made according to the present invention installed therein.

In FIG. 1, a material handler machine indicated generally at 10, as shown, has a main frame 12, and drive and steering wheels 14A and 14B. The material handler 10 can have two wheel steer, crab steer, or four wheel steer, and generally speaking all four wheels that are shown are powered, for normal operation.

The material handler frame 12 has a telescoping boom 16 mounted thereon about a pivot at the rear of the frame (not shown) and the boom extends forwardly and overlies the right hand side of the frame. It can be seen that the boom 16 is to the inside of the wheel 14A on the right hand side of the machine oriented with the operator looking forwardly.

The frame 12 also has an operator's cab or canopy shown generally at 18, which is supported on the frame 12 in a normal manner. In a telescoping boom material handler, the side of the cab adjacent to the boom is generally closed with windows or screens for visibility, so that an operator cannot move into the path of the boom as the boom pivots.

The operator cab 18 has an operator's seat 20, as can be seen which includes a seat cushion 20A and a back rest 20B. A seat belt 20C is also provided. The cab 18 has an operator opening 22 on the side opposite from the boom that permits the operator to move in and out onto the seat 20. The opening 22 can be covered by a door in some instances, but a door may not be provided, and also climate conditions may make it desirable to not have a door.

The operator cab or compartment has a floor 24 on which an operator's feet can rest (see FIG. 2) and an operator 25 seated on the seat cushion 20A is in a position to operate a joystick control 26, or other type of control systems which controls the various functions of the machine including, as will be shown schematically, the drive transmission, and the various actuators for operating the boom 16, and auxiliary equipment. The material handler has an engine (not shown) located in an engine compartment, for providing power to hydraulic circuits that include valves that are controlled by the joystick 26.

Figure 2:
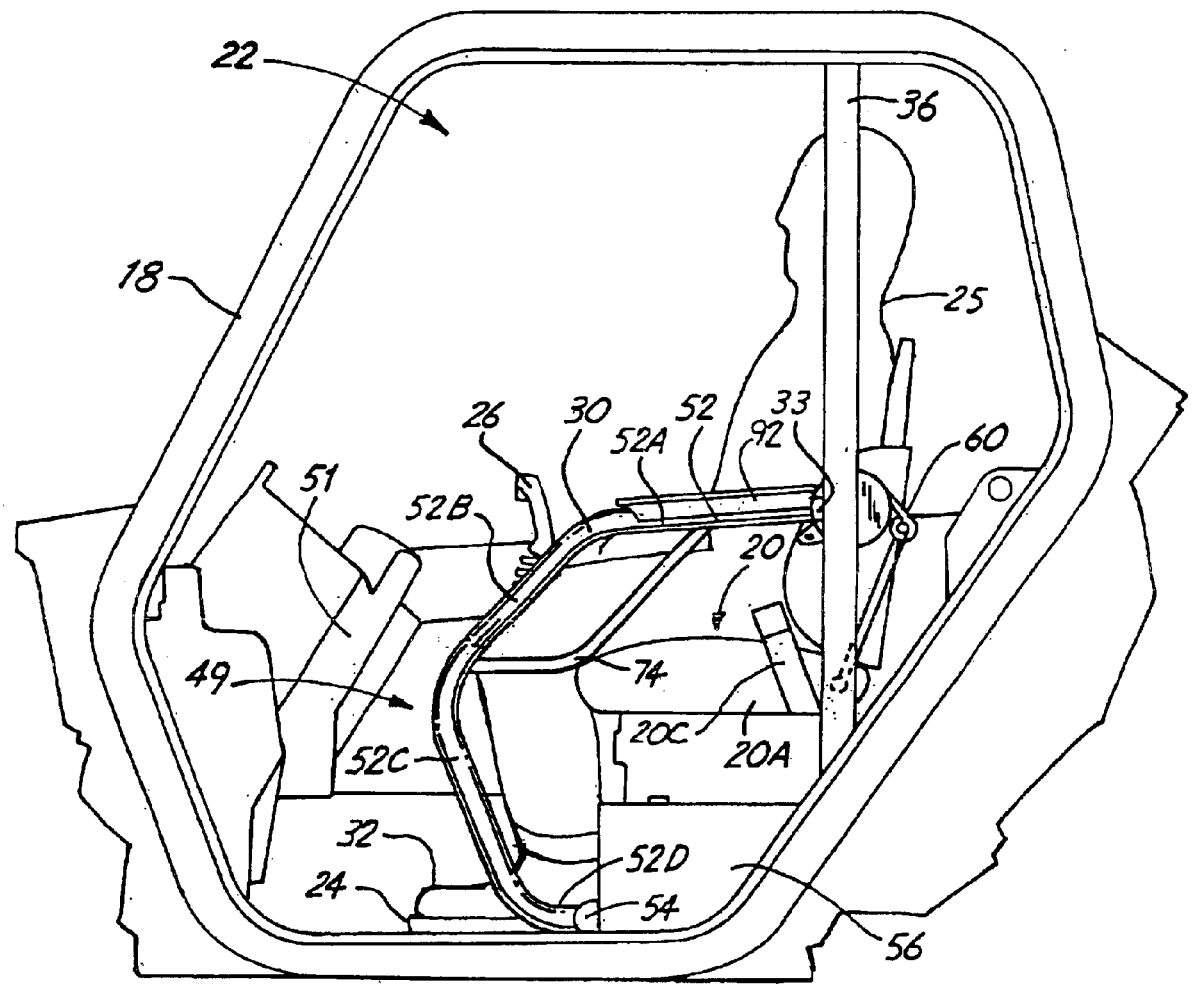
FIG. 2 is a side elevational view of the cab portion of the material handler of FIG. 1 with the restraint bar in its working position.

When the cab lateral opening 22 is unobstructed, as seen, the operator's feet and legs 32, which are illustrated in FIG. 2, for the operator seated on the seat cushion 20A, can be moved to the exterior of the cab 18, where they can be struck by objects or equipment that may be operating in the vicinity. In order to provide a lateral operator restraint, to restrain movement out through the opening 22 when working, a restraint and operator presence sensor bar assembly 30 is provided. The restraint bar 30 blocks the cab opening 22 when down, or in its working position and enables the machine controls in that position. The restraint bar will obstruct outward movement of the exterior foot and leg of the operator as shown the left leg and foot 32. The operator's body is also blocked or restrained from sliding off the seat and out the opening 22, as can be seen in FIGS. 1 and 2 by a horizontal arm rest portion.

Figure 4:
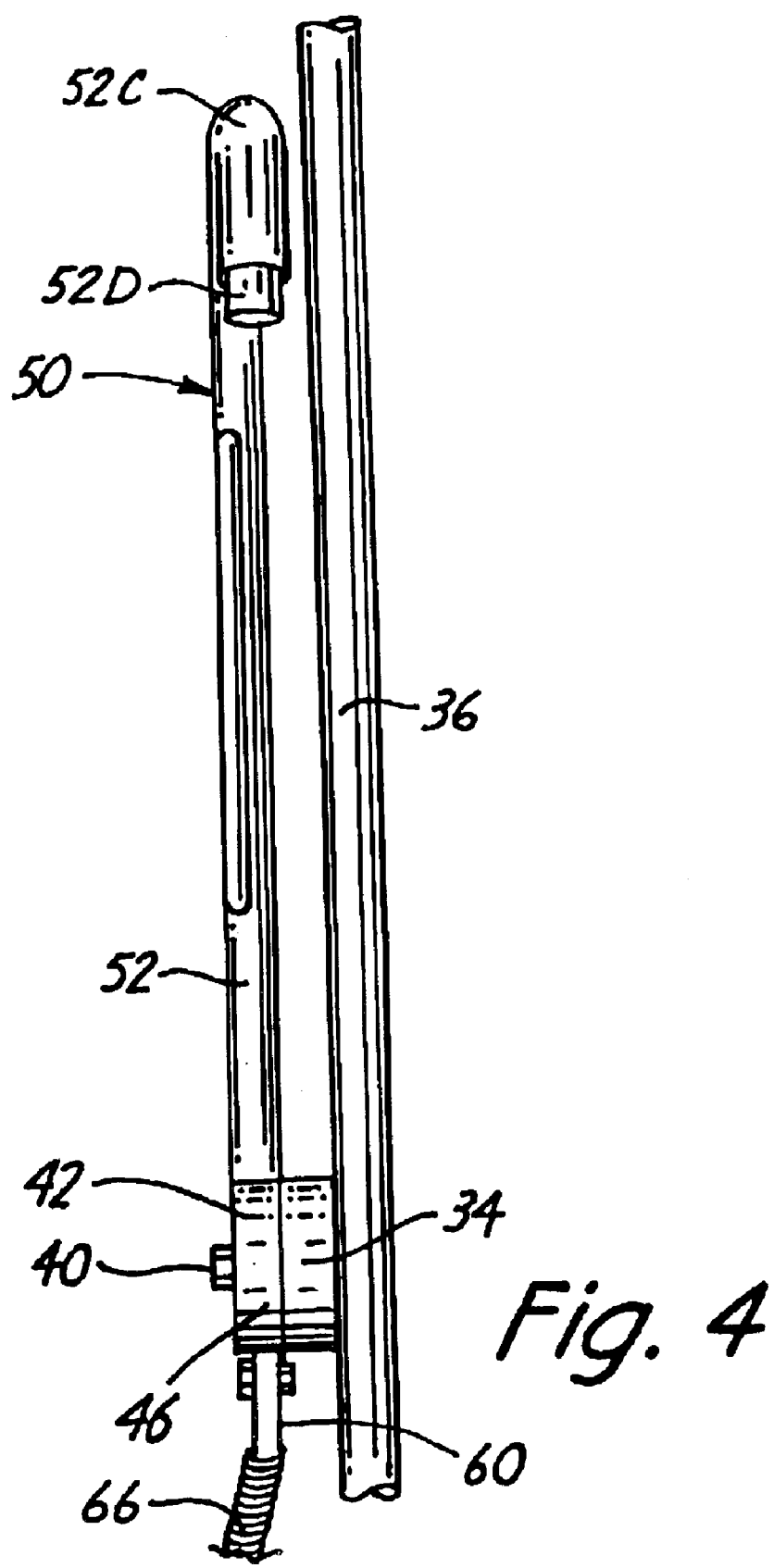
FIG. 4 is a front elevational view of the restraint bar assembly in its raised position.
Figure 5:
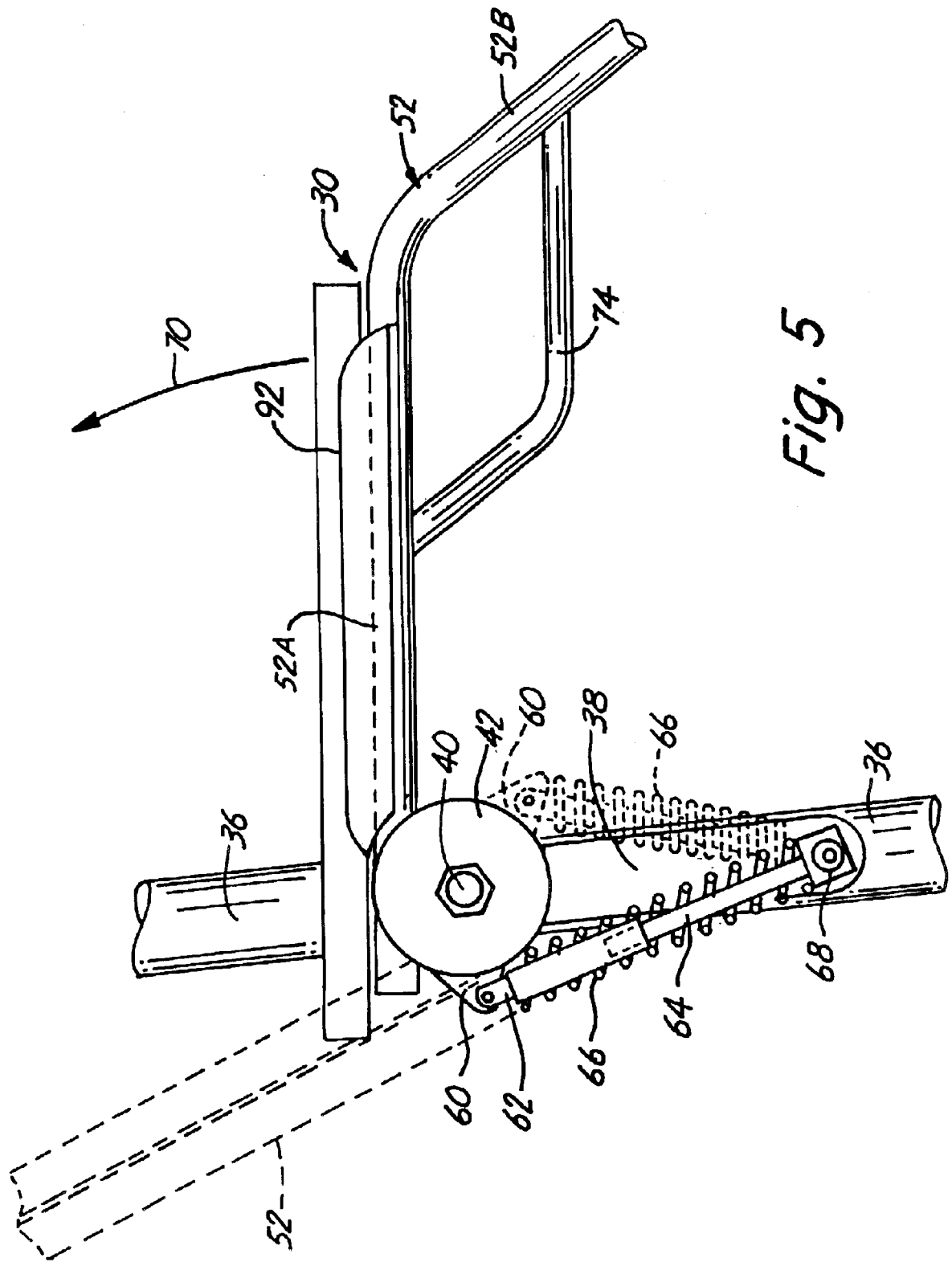
FIG. 5 is a side view from the interior of the cab showing the restraint bar system and the spring for holding the positions of the restraint bar in an enlarged view.
Figure 6:
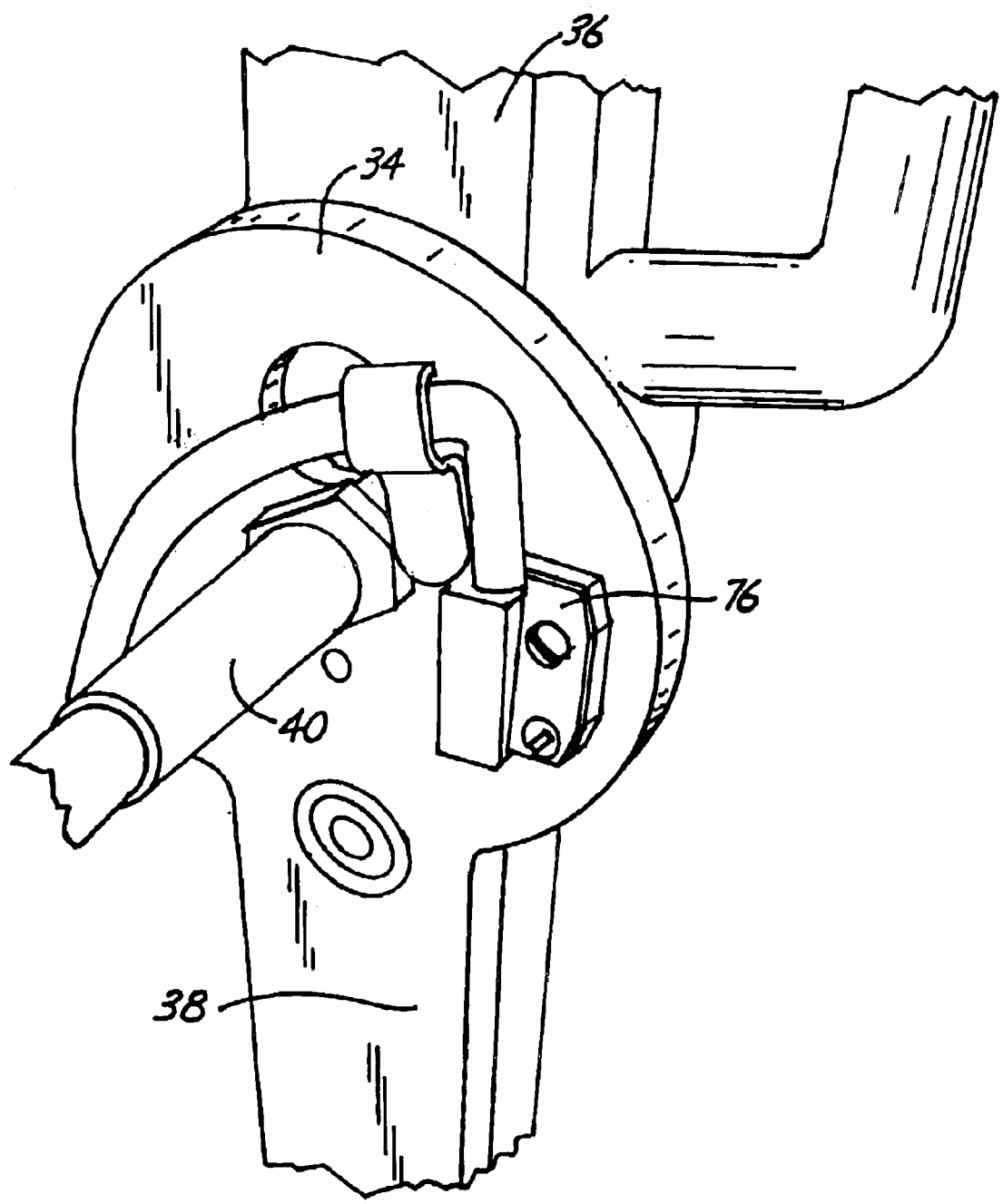
FIG. 6 is a schematic perspective view of a mounting support for the restraint bar with parts removed for sake of clarity.
Figure 7:
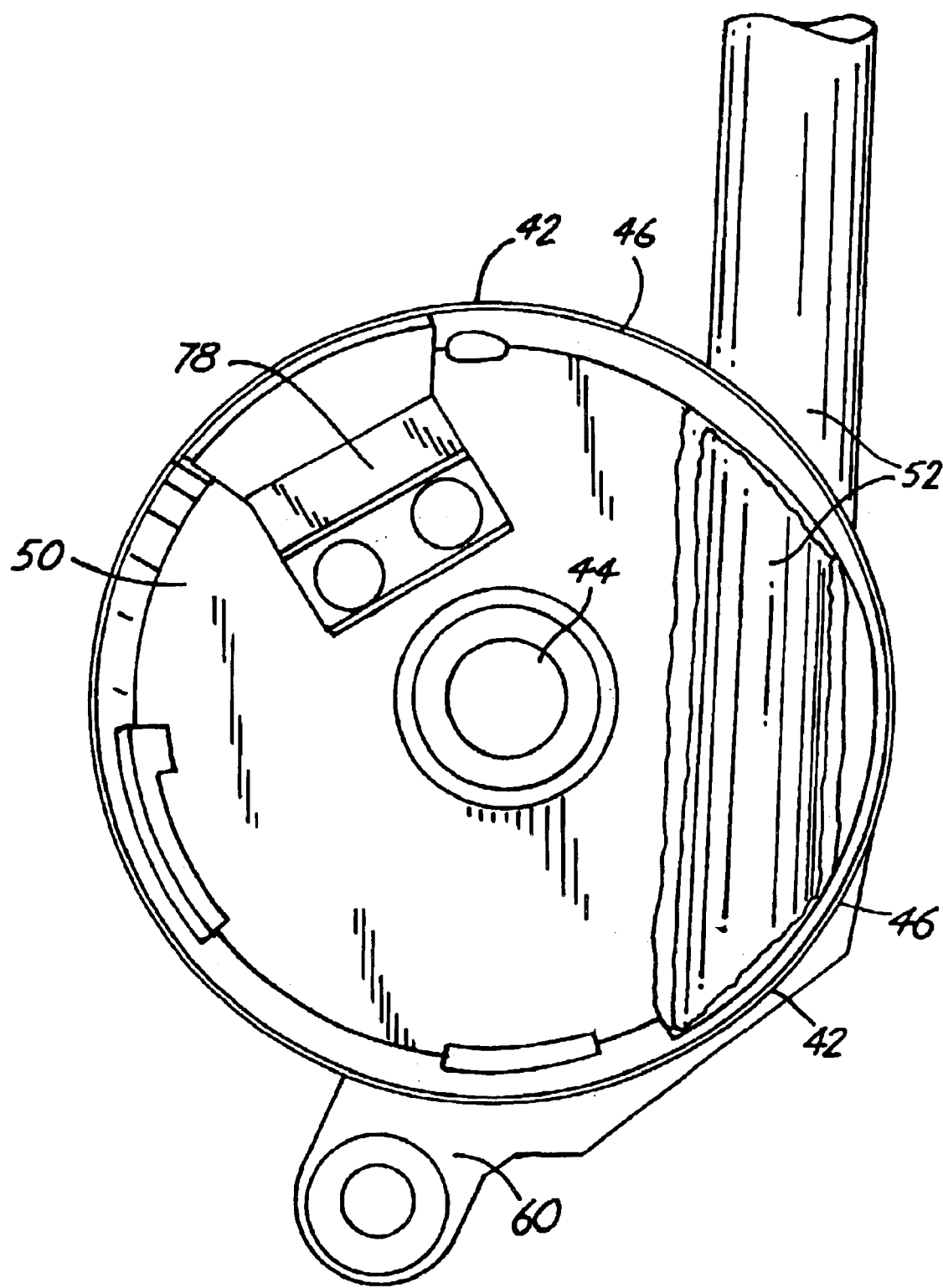
FIG. 7 is a view of an interior of a mounting hub for the restraint bar which mounts onto a pivot shaft shown in FIG. 6.

The operator restraint bar 30 has a mounting hub assembly 33, which includes a support frame 34 shown in FIG. 6 at 34 that is secured to an upright post 36 of the operator's cab or to the side panel or wall of the cab. This support frame 34 has a downwardly depending support leg 38, as can be seen, and mounts a fixed pivot shaft 40 that protrudes laterally, as can be seen so that it pivotally mounts a pivoting or rotating hub 42 (FIGS. 4, 5, and 7). The hub 42 can be held onto the shaft 40 with a nut and washer assembly at the outer end of the shaft. The rotating hub 42 as shown in FIG. 7 has a bore 44 that fits over the shaft 40, and also has a flange 46 that will surround a central chamber on the inside of an end plate 50. The hub 42 extends inwardly from an outer plate 50 of the hub 42. The plate or wall 50 is spaced from the surface of the mounting frame 34.

Movable hub 42 mounts the restraint bar 52, which is fixed to rotating hub 42, is part of assembly 30, a pipe that is bent to include a generally horizontal pipe arm rest portion 52A with a pad 92 thereon when the restraint bar is in its lowered or working position; a forwardly and downwardly inclined portion 52B that is spaced from the operator's seat cushion, and blocks the outward movement from the space ahead of the operator's seat. The space 49 is the leg space between the seat 20 and the front panel 51 of the cab. The bar or pipe portion 52B is in a position to interfere with any lateral movement of the outer foot and leg 32 of the operator 25 toward the outside.

Figure 8:
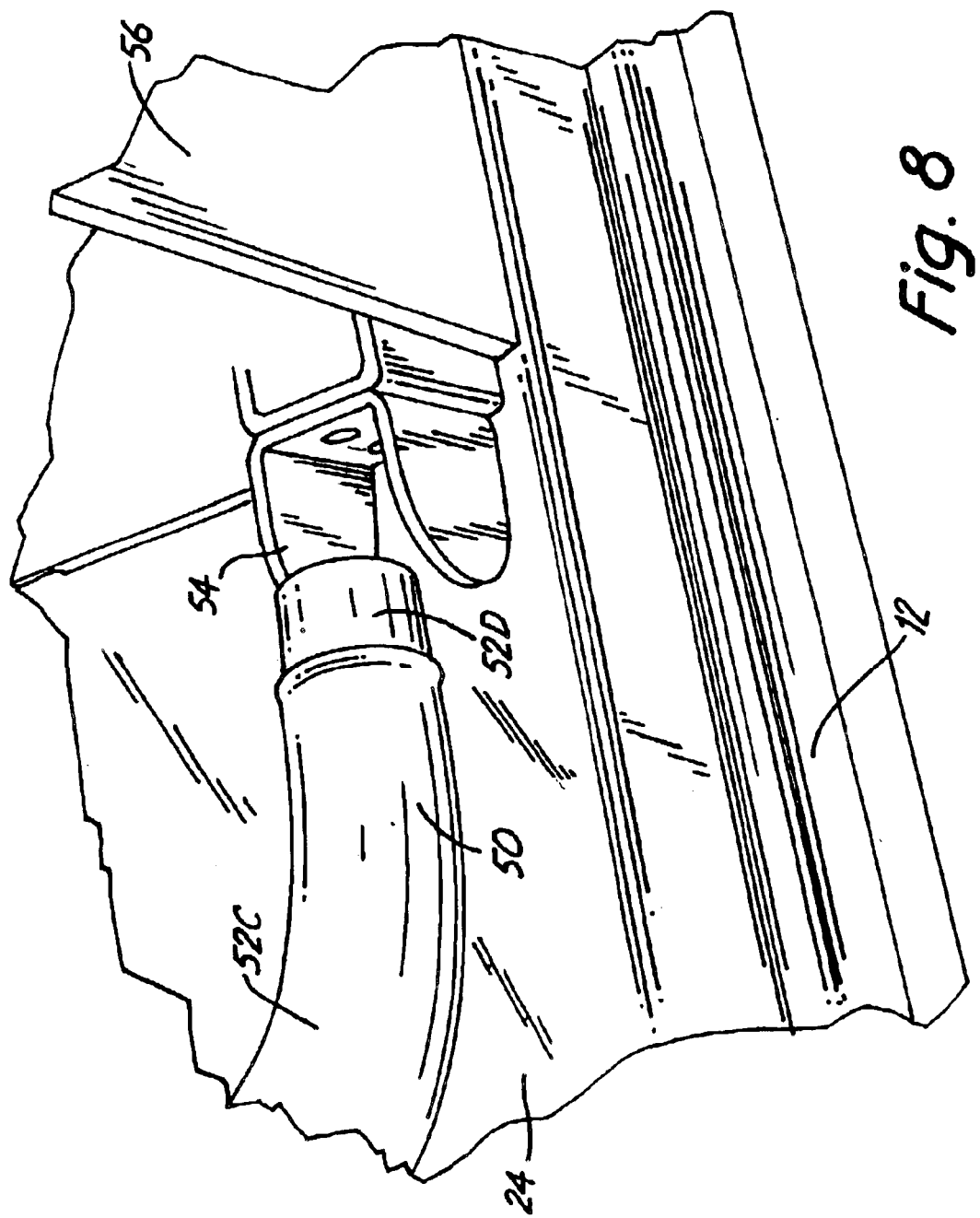
FIG. 8 is a perspective view of a retainer used with the lower end of the restraint bar when it is in its working position.

The arm rest portion 52A also restrains lateral outward movement of the operator's body and provides for operator comfort. The bar or pipe 52 has an inwardly tapering portion 52C that extends down from portions 49 across the lower portions of the operator's cab across the space 49, again to the exterior of an operator's foot and leg 32. The portion 52C has a short bent retainer end 52D formed on the restraint bar. The retainer end 52D, as can be seen in FIG. 8, is parallel to the floor 24 and is received in a retainer bracket 54 that is secured to the seat support 56 and receives the end portion 52D of the restraint bar pipe when the restraint bar is in its lowered or working position.

The hub 42 has an outwardly projecting ear 60, that is used for connecting a spring end 62, that forms part of a telescoping center slide and guide member 64 for a compression spring 66. The spring 66 acts against a pivot block 68 that is pivoted to the upright post 36 of the cab, and is used to provide a spring force that will bias the restraint bar assembly 30 and thus pipe 52 toward its working position.

Figure 3:
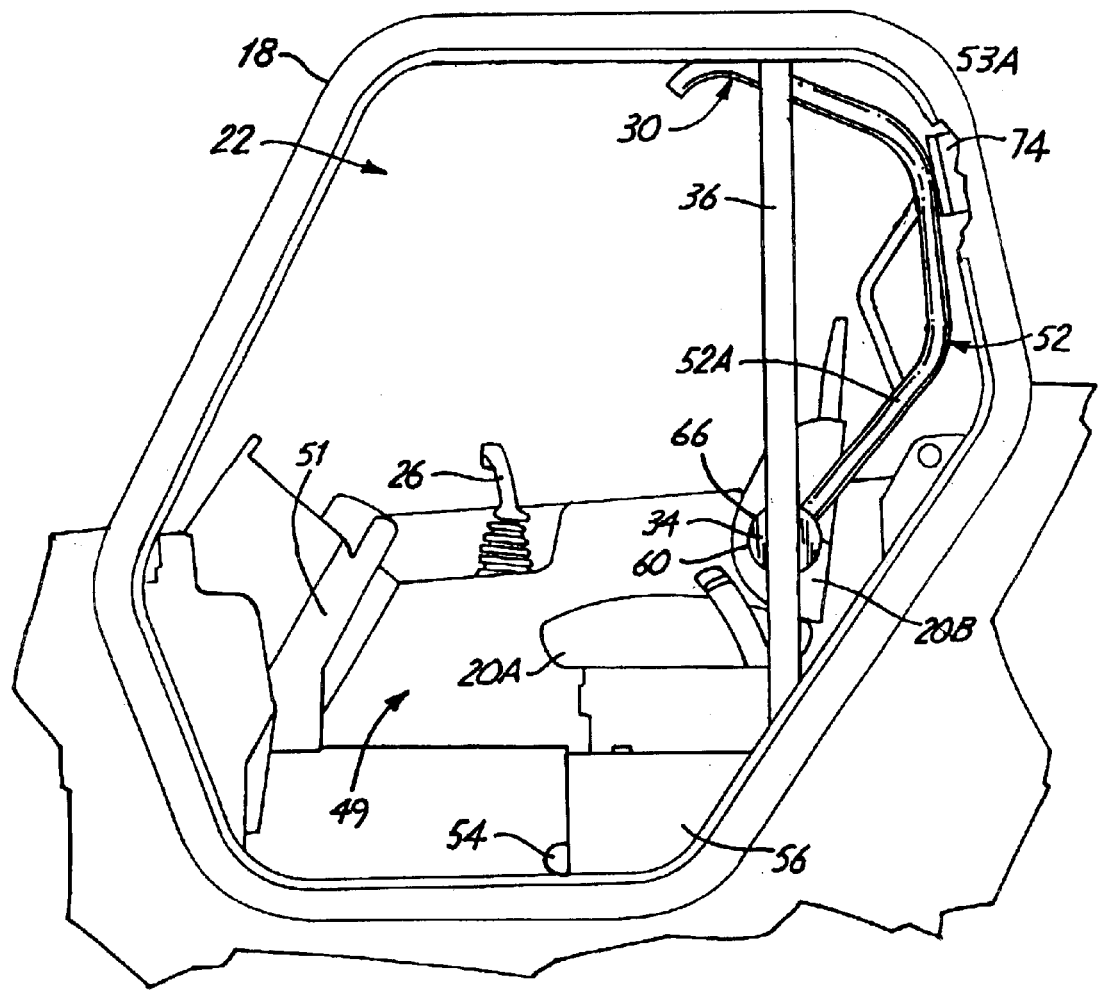
FIG. 3 is a side view similar to FIG. 2 with the restraint bar in its raised or open position.

As shown in FIG. 5, in solid lines, the hub 42 and ear 60 are positioned so the line of force from spring 66 will go "over center" relative to the pivot axis of hub 42 as the restraint bar is raised in the direction as indicated by the arrow 70 (FIG. 5), toward its open position that is shown in FIG. 3. When the restraint bar has moved to its substantially vertical position as indicated in dotted lines in FIG. 5, the spring force from spring 66 will cause the restraint bar to pivot rearwardly in the direction of arrow 70, and move against its stopped position, as shown in FIG. 3.

In FIG. 3, a portion of the cab side wall has been broken away to show a rubber bumper 74 against which the restraint bar pipe 50 will rest when it is moved toward its raised position. It can be seen that the restraint bar is out of the way when it is in its open position, with the pipe sections recessed behind the edges of the cab. The pipe 50 does not interfere with any movement of the operator when open.

It can be thus seen that the restraint bar be manually moved by grasping a handle 74, which also serves as an additional lateral restraint, and then lifting the bar against the force or spring 66 as indicated by the arrow 70 in FIG. 5 until the spring goes over center, and then the spring 66 will urge the restraint bar assembly 30 to its fully raised or open position.

More than one spring can be used, and the spring can be a tension spring, or a gas spring, or even a suitable elastomeric spring. Other types of retainers for retaining the bar in its lowered position and in its raised position can be used.

The restraint bar assembly also serves the function of disabling the controls to the material handler, when it is in its raised position making it necessary to lower the restraint bar before operating the machine. In order to achieve this, a sensor that senses the position of the restraint bar pipe 52 is utilized. The sensor can be of any desired type, but a Hall effect sensor is the preferred form shown. The Hall effect sensor 76 is fixed to the support frame 34 (FIG. 6), and is positioned relative to a magnet 78 shown in FIG. 7, that is attached to the wall 50 of the hub 42, so that when the restraint bar is very close to its working position, the Hall effect sensor will sense the magnetic field at the selected restraint bar position and enable a joystick control circuit to be operated. When the restraint bar assembly 30 is raised a short distance, for example with the end 52D raised up from the floor 24, the magnet 78 will move sufficiently far from the sensor 76 so that the joystick control circuit will be disabled, and the machine and its components cannot be operated. A brake also can be applied when the signal is sensed. The sensor that senses the working portions of the bar can be used with only the arm rest portion, or shorter sections of pipe, to effectively permit operations only when an operator has lowered the restraint bar.

Figure 9:
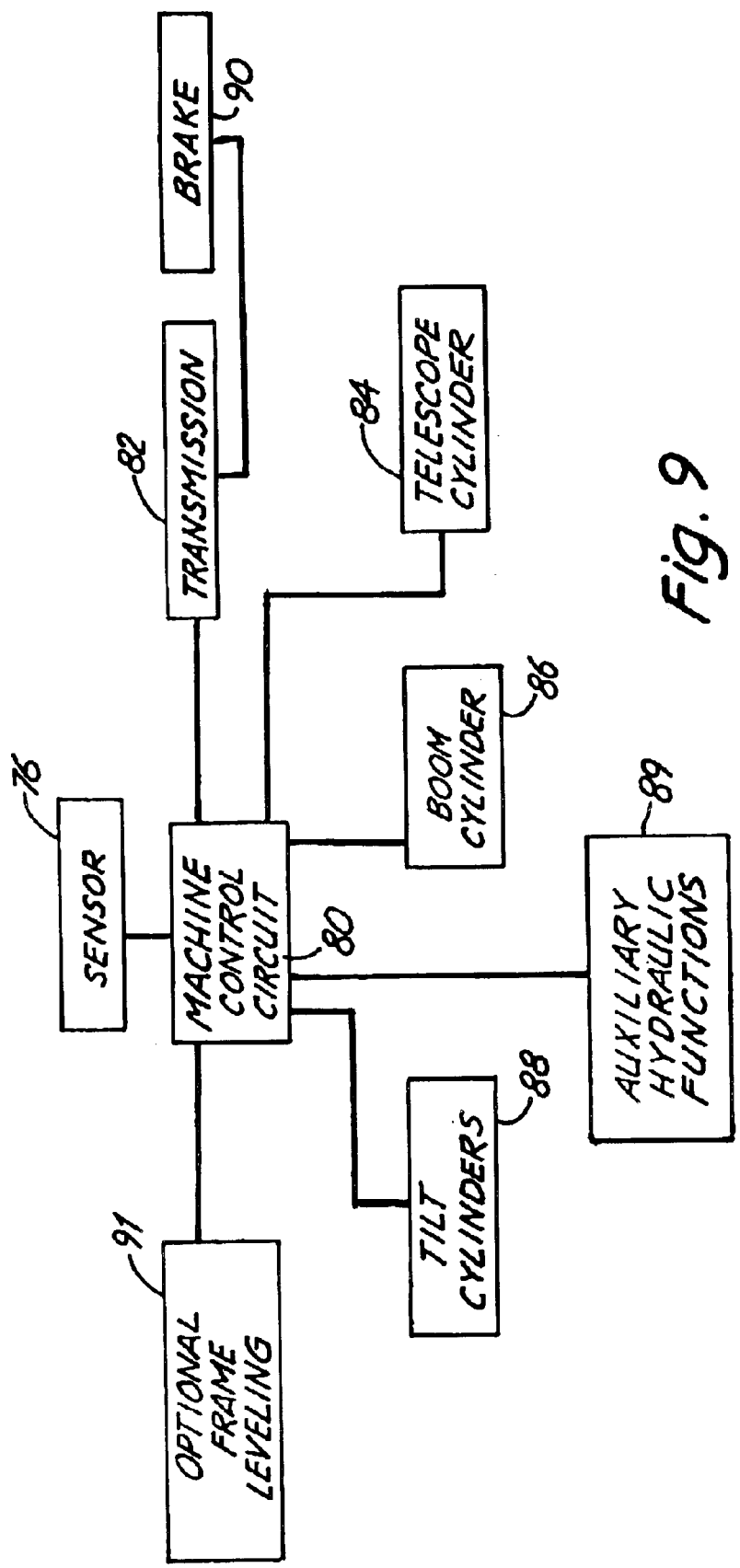
FIG. 9 is a schematic diagram of a typical control and interlock system of the present invention.

FIG. 9 shows a schematic diagram of this arrangement including the Hall effect sensor 76, that is connected to the joystick or machine control circuit 80. The control circuit 80 which as shown is a joystick control, controls numerous functions of the machine. When a desired signal is provided by a sensor 76, the machine control or interlock circuit will lock out the transmission 82; the boom telescoping cylinders 84; the boom pivot cylinder 86; the tilt cylinders (they are used for auxiliary equipment 88). The conventional transmission used has a circuit that actuates brakes when it is in neutral, after a time delay. When the transmission is locked out, by the sensor signal the transmission acts as if it is in neutral and the control for the transmission will actuate the brake 90 that is provided on the machine after about a one second time delay. Hydraulic auxiliary functions 89 can be locked out and if provided, a frame leveling circuit 91 can be disabled. Many of these components are controlled conventionally by the machine control circuit, operated as shown with the joystick 26 by the operator. Of course, the items or functions that are disabled can be one or more of any type of operation which should not be operated when the operator is not present.

The lateral restraint bar assembly 30, therefore, is positioned between the open lateral side of the cab and the operator's seat, and is movable to a raised position. As shown, the bar assembly 30 is pivoted about a horizontal axis at a suitable location using a post or other frame member from the cab so that when it is raised it will be retracted up to the periphery of the opening for the cab and out of the way, but when lowered, it will provide a barrier for the feet and legs of an operator, as well as the portions of the operator's body above the seat, to restrain lateral movement out through the cab opening either inadvertently or intentionally. The arm rest portions restrain the operator's body from movement out the cab opening when in its working position.

The restraint bar 52 is retained in its two positions with a single spring as shown that will go over center so that in portions of the pivoting action it will urge the restraint toward its working position, and serve to retain it in that position during use, but which will then go over center as the restraint bar is pivoted toward its open position, and will hold the restraint bar in its open position.

The sensor that is used as shown is a Hall effect sensor so that it is not a contact type sensor and has great reliability. Other sensors for providing a disabling/enabling signal can be used, so long as they will operate reliably under working conditions. The sensor is also enclosed within the hub 42, and the flange 46, so that it is protected from damage.

Spring 66 has sufficient force so that it will hold the restraint bar assembly 30 in its working position even in rough terrain operations, and it will hold it sufficiently lightly so that the sensor will not be accidentally moved sufficiently to disable the machine control circuit. The spring also will hold the restraint bar assembly 30 in its upper or open position, while not exerting excessive force. An operator can lift and lower the bar assembly quite easily.

The restraint bar can be covered with a suitable foam or elastomeric material for comfort, and of course the arm rest 92 can be formed in any desired manner.

Disabling the control circuits also insures that the operator lowers the restraint bar in order to operate the machine's controls.

The operator restraint bar may be designed in various ways, for example by extending forwardly to the dash board 51, or end part way up on the seat support. It can operate as an arm rest that blocks substantial lateral leg movement as well. It also can be mounted for movement between its lower and raised position by links, sliding connections and other mounting devices. Pivoting the lateral restraint bar is a convenient mounting arrangement.

Although the present invention has been described with reference to preferred embodiments, workers skilled in the art will recognize that changes may be made in form and detail without departing from the spirit and scope of the invention.

What is claimed is:

1. A self-propelled machine having a frame, and an operator's cab on the frame, the operator's cab comprising:

a side opening, sized for entrance to and egress from the cab;

an operator's support on the interior of the cab;

a lateral restraint bar between the operator's support and the side opening, said lateral restraint bar being movably mounted relative to the cab at a single pivot and movable from a lowered position with a portion of the bar obstructing lateral movement through at least a portion of the side opening, to a raised position wherein the lateral restraint bar is moved to clear a major portion of the lateral opening to the cab sufficiently to permit an operator to enter and exit the cab through the side opening to reach the operator's support, the lateral restraint bar being shaped to be substantially restricted to a plane of its rotation about the pivot.

2. The self-propelled machine of claim 1, wherein the operator's support comprises a seat, and said cab has an upright post that is positioned adjacent a rear portion of the seat, and wherein the lateral restraint bar is pivotally mounted on the post, the lateral restraint bar comprising a single arm rest portion that is supported solely by the single pivot, and that extends generally horizontally adjacent a first side of the seat when the lateral restraint bar is in its lowered position.

3. A self-propelled machine having a frame and an operator's cab on the frame, the operator's cab comprising:

a side opening, sized for entrance to and egress from the cab;

an operator's support on the interior of the cab, the operator's support comprising a seat;

a lateral restraint bar between the operator's support and the side opening, said lateral restraint bar being movably mounted relative to the cab and movable from a lowered position with a portion of the bar obstructing lateral movement through at least a portion of the side opening, to a raised position wherein the lateral restraint bar is moved to clear a major portion of the lateral opening to the cab sufficiently to permit an operator to enter and exit the cab through the side opening to reach the operator's support;

an upright post that is positioned adjacent a rear portion of the seat, wherein the lateral restraint bar is pivotally mounted on the post, the lateral restraint bar comprising a generally horizontal arm rest portion adjacent the seat when the lateral restraint bar is in its lowered position;

wherein the lateral restraint bar comprises a second portion that extends downwardly from the generally horizontal arm rest portion toward a floor of the cab, to contribute to the obstructing lateral movement toward the side opening at a space forward of the seat; and a retainer for retaining an end of the second portion of said lateral restraint bar relative to the cab when the lateral restraint bar is in its working position.

4. The self-propelled machine of claim 3, wherein said cab has a forward panel portion on the interior, and a space between the operator's support and the forward panel portion, wherein the space is configured for an operator's legs and feet to be placed in the space when an operator is on the operator's support, said restraint bar being aligned alongside the space and between the operator support and the side opening when the restraint bar is in its lowered position.

5. The self-propelled machine of claim 3, wherein the lateral restraint bar is biased toward its working position in a first portion of the lateral restraint bar movement between the lowered and raised positions, and wherein the lateral restraint bar is biased toward its raised position in a second portion of the lateral restraint bar movement between the lower and raised positions, with a biasing member connected between the lateral restraint bar and the machine.

6. The self-propelled machine of claim 3, wherein a position sensor is provided on the cab to sense position of the lateral restraint bar.

7. The self-propelled machine of claim 6, wherein the position sensor comprises a first portion of the sensor mounted on the lateral restraint bar, a second portion of the position sensor mounted on the cab adjacent the, restraint bar, and the portions of the sensor portions being relatively positioned to provide a signal indicating when the lateral restraint bar is moved a selected distance away from its lowered position.

8. The self-propelled machine of claim 3, wherein said retainer comprises a retainer secured to the cab, having a portion that receives the end of the restraint bar.

9. A self-propelled machine having a frame and an operator's cab on the frame, the operator's cab comprising:

a side opening, sized for entrance to and egress from the cab;

an operator's support on the interior of the cab, the operator's support comprising a seat;

a lateral restraint bar between the operator's support and the side opening, said lateral restraint bar being movably mounted relative to the cab and movable from a lowered position with a portion of the bar obstructing lateral movement through at least a portion of the side opening, to a raised position wherein the lateral restraint bar is moved to clear a major portion of the lateral opening to the cab sufficiently to permit an operator to enter and exit the cab through the side opening to reach the operator's support;

an upright post that is positioned adjacent a rear portion of the seat, wherein the lateral restraint bar is pivotally mounted on the post, the lateral restraint bar comprising a generally horizontal arm rest portion adjacent the seat when the lateral restraint bar is in its lowered position; and wherein the lateral restraint bar comprises a second portion that extends downwardly from the generally horizontal arm rest portion toward a floor of the cab.

10. A movable bar member for an operator self-propelled machine having a frame and an operator's cab on the frame, an operator's seat on the interior of the cab, the member comprising an arm rest portion pivotally mounted relative to the cab about a single pivot mount on a side of the cab, the member being shaped to be substantially restricted to a plane of its rotation about the pivot, and being movable from a working position with the arm rest portion adjacent the seat, and movable to a raised position wherein the arm rest portion is pivoted upwardly to a position to permit lateral movement of an operator on the seat.

11. A movable bar member for an operator self-propelled machine having a frame and an operator's cab on the frame, and an operator's seat on the interior of the cab, the member comprising:

an arm rest portion pivotally mounted relative to the cab about an axis and movable from a working position with the arm rest portion adjacent the seat, and movable to a raised position wherein the arm rest portion is pivoted upwardly to a position to permit lateral movement of an operator on the seat, wherein the arm rest portion is generally horizontal when it is in its working position and is alongside the seat;

a second forward portion that extends outwardly to form an obstruction to lateral movement forwardly of the seat to restrain lateral movement toward the side opening, and a retainer for retaining an end of the second forward portion of said bar member relative to the cab when the arm rest portion is in its working position.

12. The movable bar member of claim 11, wherein a position sensor is provided on the arm rest portion to sense position of the arm rest portion.

13. The movable bar member of claim 12, wherein the position sensor comprises a first portion of the sensor mounted on the arm rest portion, a second portion of the position sensor fixedly mounted relative to the cab adjacent the first portion of the sensor, the first and second position sensor portions being relatively positioned to provide a signal indicating when the arm rest portion is moved a selected distance away from its working position.

14. The movable bar member of claim 13, wherein the self-propelled machine has controls for operating the vehicle, the signal from the position sensor being connected to disable the controls when the arm rest portion is moved the selected distance from its working position.

15. The movable bar member of claim 11, wherein the arm rest portion is biased toward its working position in a first portion of the arm rest portion movement between the working and raised positions, and is biased toward the arm rest portion raised position in a second portion of movement between the arm rest portion working and raised position.

16. A movable bar for a controllable self-propelled machine, forming a sensor and lateral restraint, comprising:

a bar having a bar mounting frame adapted to be secured to a machine cab;

a support on the bar mounting frame, the bar including an arm rest portion and a hub fixed to the arm rest portion, the hub being mounted on the support of the bar mounting frame for movement between a lowered position and a raised position;

a sensor assembly mounted on the frame to sense when the arm rest portion is moved away from its lowered position toward its raised position a selected amount, and to provide a signal capable of disabling controls for a controllable machine on which the bar mounting frame is mounted; and a retainer for retaining an end of the bar relative to the cab when the arm rest portion is in its lowered position.

* * * * *

UNITED STATES PATENT AND TRADEMARK OFFICE
CERTIFICATE OF CORRECTION

PATENT NO.    : 6,902,024 B2
DATED         : June 7, 2005
INVENTOR(S)   : Miiller et al.

It is certified that error appears in the above-identified patent and that said Letters Patent is hereby corrected as shown below:

Column 7,
Line 38, delete "," after "adjacent the".

Signed and Sealed this

Twenty-ninth Day of November, 2005

JON W. DUDAS
*Director of the United States Patent and Trademark Office*